United States Patent
Kai et al.

(10) Patent No.: US 10,777,796 B2
(45) Date of Patent: Sep. 15, 2020

(54) SECONDARY BATTERY SEPARATOR AND SECONDARY BATTERY

(71) Applicant: Toray Industries, Inc., Tokyo (JP)

(72) Inventors: Nobuyasu Kai, Otsu (JP); Akimitsu Tsukuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 107 days.

(21) Appl. No.: 16/086,539

(22) PCT Filed: Mar. 16, 2017

(86) PCT No.: PCT/JP2017/010651
§ 371 (c)(1),
(2) Date: Sep. 19, 2018

(87) PCT Pub. No.: WO2017/169845
PCT Pub. Date: Oct. 5, 2017

(65) Prior Publication Data
US 2019/0103593 A1    Apr. 4, 2019

(30) Foreign Application Priority Data

Mar. 29, 2016  (JP) ................................. 2016-065131
Dec. 22, 2016  (JP) ................................. 2016-248745

(51) Int. Cl.
*H01M 2/16* (2006.01)
*H01M 10/0525* (2010.01)

(52) U.S. Cl.
CPC .......... *H01M 2/16* (2013.01); *H01M 10/0525* (2013.01)

(58) Field of Classification Search
CPC .... H01M 2/16; H01M 10/0525; H01M 2/145; H01M 2/1686; H01M 2/166
See application file for complete search history.

(56) References Cited

U.S. PATENT DOCUMENTS

| | | | |
|---|---|---|---|
| 10,374,204 B2 * | 8/2019 | Honda | H01M 2/1686 |
| 2011/0159347 A1 * | 6/2011 | Shibano | H01M 2/1646 429/144 |
| 2014/0363726 A1 | 12/2014 | Honda et al. | |
| 2015/0236323 A1 | 8/2015 | Honda et al. | |
| 2017/0346057 A1 * | 11/2017 | Kai | C08J 3/14 |

FOREIGN PATENT DOCUMENTS

| | | |
|---|---|---|
| JP | 2016-72162 A | 5/1916 |
| JP | 2004-146190 A | 5/2004 |
| JP | 2012-221741 A | 11/2012 |
| JP | 2013-187074 A | 9/2013 |
| JP | 5355823 B1 | 11/2013 |
| WO | 2013/133074 A1 | 9/2013 |

* cited by examiner

*Primary Examiner* — Stewart A Fraser
(74) *Attorney, Agent, or Firm* — DLA Piper LLP (US)

(57) ABSTRACT

A secondary battery separator includes a porous base material; and a porous layer stacked on at least one surface of the porous base material, the porous layer being mainly composed of inorganic particles, and two or more organic resins having different melting points, the porous layer including a fluororesin as at least one of the organic resins, the secondary battery separator satisfying at least one of (A) and/or (B): (A) the porous layer has a melting point of 130° C. or higher and 20° C. or higher and lower than 130° C.; and (B) the porous layer has a melting point of 130° C. or higher, and includes an amorphous organic resin.

16 Claims, No Drawings

SECONDARY BATTERY SEPARATOR AND SECONDARY BATTERY

TECHNICAL FIELD

This disclosure relates to a secondary battery separator and a secondary battery.

BACKGROUND

Secondary batteries such as lithium ion batteries are widely used in portable digital devices such as mobile phones, notebook computers, digital cameras, digital video cameras and portable game machines. In recent years, such secondary batteries have been increasingly used as power sources for hybrid cars, electric cars, plug-in hybrid cars and so on in automobile applications.

A lithium ion battery generally has a configuration in which a secondary battery separator and an electrolyte are interposed between a positive electrode with a positive active material stacked on a positive electrode current collector and a negative electrode with a negative active material stacked on a negative electrode current collector.

As a secondary battery separator, a polyolefin porous base material is used. Characteristics required for secondary battery separators include a characteristic in which the separator contains an electrolyte solution in a porous structure so that ion movement is possible, and a characteristic in which if abnormal heat generation occurs in a lithium ion battery, the material is melted by heat to close the porous structure so that ion movement is stopped to stop power generation.

However, with an increase in capacity and power of lithium ion batteries in recent years, secondary battery separators have been required to have not only the above-mentioned characteristics, but also adhesiveness with an electrode with the separator impregnated with an electrolyte solution (wet adhesiveness) to prevent deterioration of cycle performance due to generation of gaps between the electrode and the secondary battery separator in charge-discharge repetitions. In addition, with an increase in capacity and power of lithium ion batteries in recent years, secondary battery separators have been required to have high safety. In addition, secondary battery separators have been required to have dimensional stability to prevent a short circuit resulting from contact between a positive electrode and a negative electrode, which is caused by thermal shrinkage of the secondary battery separator at a high temperature. In addition, secondary battery separators have been required to have adhesiveness between the separator and an electrode before impregnation of an electrolyte solution (dry adhesiveness) to maintain the shape of a laminate in transportation of the laminate of a positive electrode, a separator and a negative electrode, or to prevent collapse of the shape of a laminate in pressing before insertion of the wound laminate of a positive electrode, a separator and a negative electrode into a mold such as a cylindrical mold or a square mold. Further, with widespread use of secondary batteries, it has been required to reduce production costs of secondary batteries and secondary battery separators.

For these requirements, Japanese Patent Laid-open Publication No. 2004-146190 and Japanese Patent Laid-open Publication No. 2012-221741 propose a secondary battery separator in which a porous layer mainly composed of a polyvinylidene fluoride resin having wet adhesiveness is stacked on a porous base material composed of a polyolefin so that adhesiveness with an electrode is improved. Japanese Patent Publication No. 5355823 proposes a secondary battery separator in which a porous layer mainly composed of particles formed of a polyvinylidene fluoride resin having wet adhesiveness is stacked on a porous base material composed of a polyolefin so that wet adhesiveness with an electrode is improved. In addition, International Publication No. WO 2013/133074 proposes a secondary battery separator in which a porous layer composed of particles formed of a polyvinylidene fluoride resin having adhesiveness and inorganic particles is stacked on a porous base material composed of a polyolefin so that wet adhesiveness with an electrode and dimensional stability are improved.

However, in Japanese Patent Laid-open Publication No. 2004-146190 and Japanese Patent Laid-open Publication No. 2012-221741, it is proposed as a production method that a release film or a porous base material is coated with a fluororesin dissolved in an organic solvent, and immersed in a coagulation tank to form a porous layer, and that production method improves the wet adhesiveness of a secondary battery separator with an electrode, but is a high-cost production method, and thus cannot satisfy the current requirement of reducing costs for the secondary battery separator. In addition, the dry adhesiveness with an electrode in a state in which the separator is not impregnated with an electrolyte solution is not sufficient. In Japanese Patent Publication No. 5355823 and International Publication No. WO 2013/133074, the molecular weight of a polyvinylidene fluoride resin to be used is not appropriate and, therefore, sufficient wet adhesiveness with an electrode cannot be obtained. In addition, the dry adhesiveness with an electrode in a state in which the separator is not impregnated with an electrolyte solution is not sufficient.

Thus, in view of the above-mentioned problems, there is a need to provide a secondary battery separator that exhibits wet adhesiveness and dry adhesiveness with an electrode and dimensional stability at a low cost.

SUMMARY

We found that when a fluororesin and an organic resin each having a melting point in a specific range is used, wet adhesiveness and dry adhesiveness with an electrode are exhibited. Further, when the fluororesin is formed into particles, and mixed with inorganic particles to obtain a coating agent, and the coating agent is applied by a common coating method, wet adhesiveness and dry adhesiveness with an electrode and dimensional stability can be exhibited at a low cost.

We thus provide:

(1) A secondary battery separator including: a porous base material; and a porous layer stacked on at least one surface of the porous base material, the porous layer being mainly composed of inorganic particles, and two or more organic resins having different melting points, the porous layer including a fluororesin as at least one of the organic resins, the secondary battery separator satisfying at least one of the following requirements (A) and/or (B):

(A) the porous layer has a melting point of 130° C. or higher and 20° C. or higher and lower than 130° C.; and (B) the porous layer has a melting point of 130° C. or higher, and includes an amorphous organic resin.

(2) A secondary battery separator including: a porous base material; and a porous layer stacked on at least one surface of the porous base material, the porous layer being mainly composed of inorganic particles, and two or more organic resins having different melting points, the porous layer including a fluororesin as at least one of the organic resins, the porous layer having a melting point of 130° C. or higher and 20° C. or higher and lower than 130° C.

(3) The secondary battery separator according to (1) or (2), which satisfies at least one of the following requirements (C) and/or (D):

(C) the porous layer has a melting point of 130° C. or higher and lower than 180° C. and 20° C. or higher and lower than 130° C.; and (D) the porous layer has a melting point of 130° C. or higher and lower than 180° C., and includes an amorphous organic resin.

(4) The secondary battery separator according to any one of (1) to (3), wherein the organic resins include an acrylic resin and/or an olefin resin.

(5) The secondary battery separator according to any one of (1) to (4), wherein at least one of the organic resins has an acidic functional group.

(6) The secondary battery separator according to any one of (1) to (5), wherein the fluororesin is a polyvinylidene fluoride resin having a vinylidene fluoride content of 80 mol % or more and 100 mol % or less.

(7) The secondary battery separator according to (6), wherein the polyvinylidene fluoride resin has a melting point of 130° C. or higher.

(8) The secondary battery separator according to (6) or (7), wherein the polyvinylidene fluoride resin is in the form of particles, and has an average particle size of 0.01 µm or more and less than 1.00 µm.

(9) A secondary battery including the secondary battery separator according to any one of (1) to (8).

A porous layer is mainly composed of two or more organic resins having different melting points, at least one of the organic resins is a fluororesin, and at least one of the following requirements (A) and/or (B) is satisfied so that sufficient wet adhesiveness and dry adhesiveness with an electrode can be imparted, and the porous layer contains inorganic particles so that dimensional stability can be imparted.

(A) the porous layer has a melting point of 130° C. or higher and 20° C. or higher and lower than 130° C.; and (B) the porous layer has a melting point of 130° C. or higher, and includes an amorphous organic resin.

By using the secondary battery separator, it is possible to provide a secondary battery such as a lithium ion battery having a high capacity, a long lifetime and a high power can be provided at a low cost.

DETAILED DESCRIPTION

Our secondary battery separator includes: a porous base material; and a porous layer stacked on at least one surface of the porous base material, the porous layer being mainly composed of inorganic particles, and two or more organic resins having different melting points, the porous layer including a fluororesin as at least one of the organic resins, the secondary battery separator satisfying at least one of the following requirements (A) and/or (B):

(A) the porous layer has a melting point of 130° C. or higher and 20° C. or higher and lower than 130° C.; and (B) the porous layer has a melting point of 130° C. or higher, and includes an amorphous organic resin.

Hereinafter, our separators and batteries will be described in detail.

Porous Layer
Organic Resin

The porous layer is mainly composed of inorganic particles, and two or more organic resins having different melting points. At least one of the organic resins is a fluororesin. The melting point is a temperature at a peak top of an endothermic peak (hereinafter, sometimes referred to as a "peak top") during second heating after first heating and cooling in differential scanning calorimetry (DSC) performed in accordance with "JIS K 7121: 2012, "Method for Measurement of Transition Temperature of Plastic". In addition, the phrase "having different melting points" means not only that organic resins each have a melting point, and the melting points of these organic resins are mutually different, but also that one organic resin has a melting point, and the other organic resin is an amorphous organic resin.

Examples of the organic resin that forms the porous layer include olefin resins such as polyethylene and polypropylene, acrylic resins, styrene-butadiene resins, crosslinked polystyrenes, methyl methacrylate-styrene copolymers, polyimides, melamine resins, phenol resins, polyacrylonitriles, silicon resins, urethane resins, polycarbonates and carboxymethylcellulose resins in addition to fluororesins. The phrase "mainly composed of inorganic particles and two or more organic resins having different melting points" means that the ratio of inorganic particles and two or more organic resins having different melting points to the total porous layer is 70% by mass or more.

Among these resins, two or more fluororesins having different melting points may be used. In addition, a fluororesin, and one or more organic resin which has a melting point different from that of the fluororesin and which is not a fluororesin may be used. In addition, two or more organic resins each having a melting point different from that of the fluororesin may be used. In particular, from the viewpoint of electric stability and oxidation resistance, it is preferable to use an acrylic resin and/or an olefin resin as the other organic resin having a melting point different from that of the fluororesin.

One aspect of the porous layer has a melting point of 130° C. or higher and 20° C. or higher and lower than 130° C. That is, the porous layer has at least one melting point of 130° C. or higher and at least one melting point of 20° C. or higher and lower than 130° C. when the melting point of the porous layer is measured by a method as described in the section of examples. The porous layer may have two or more melting points of 130° C. or higher and two or more melting points of 20° C. or higher and lower than 130° C. That is, the porous layer may have one melting point of 130° C. or higher, and two or more melting points of 20° C. or higher and lower than 130° C., or may have two or more melting points of 130° C. or higher, and one melting point of 20° C. or higher and lower than 130° C., or may have two or more melting points of 130° C. or higher, and two or more melting points of 20° C. or higher and lower than 130° C.

In addition, it is preferable that the porous layer has a melting point of 130° C. or higher and lower than 180° C. and 30° C. or higher and lower than 120° C. More preferably, the porous layer has a melting point of 140° C. or higher and lower than 180° C. and 40° C. or higher and lower than 100° C.

Preferably, an organic resin having a melting point of 130° C. or higher and an organic resin having a melting point of 20° C. or higher and lower than 130° C. are used for the porous layer. More preferably, an organic resin having a melting point of 130° C. or higher and lower than 180° C. and an organic resin having a melting point of 30° C. or higher and lower than 120° C. are used. Still more preferably, an organic resin having a melting point of 140° C. or higher and lower than 180° C. and an organic resin having a melting point of 40° C. or higher and lower than 100° C.

are used. The organic resin having a melting point of 130° C. or higher is used to obtain wet adhesiveness with an electrode as one example. When the melting point is lower than 130° C., it may be impossible to obtain sufficient wet adhesiveness. In addition, the organic resin having a melting point of 20° C. or higher and lower than 130° C. is used to obtain dry adhesiveness with an electrode as one example. When the melting point is lower than 20° C., battery characteristics may be deteriorated due to deformation and elution in an electrolyte solution in charge-discharge repetitions of a secondary battery. In addition, when the melting point is 130° C. or higher, it may be impossible to obtain sufficient dry adhesiveness with an electrode.

One aspect of the porous layer has a melting point of 130° C. or higher, and has an amorphous organic resin. The amorphous organic resin mentioned here refers to a resin that does not have a melting point, i.e. a resin that does not have an endothermic peak, in measurement using a differential scanning calorimeter. That is, the porous layer has at least one melting point of 130° C. or higher when the melting point of the porous layer is measured by a method as described in the section of examples. The porous layer may have two or more melting points of 130° C. or higher. In addition, the porous layer has a melting point of more preferably 130° C. or higher and lower than 180° C., still more preferably 140° C. or higher and lower than 180° C.

Preferably, at least one of the organic resins has an acidic functional group to improve wet adhesiveness with an electrode. In addition, when the organic resin has an acidic functional group, affinity with an electrolyte solution is improved so that it is possible to improve productivity in production of a secondary battery, and battery characteristics. The acidic functional group is a functional group capable of releasing protons ($H^+$). Specific examples of the acidic functional group include a carboxylic acid group, a sulfonic acid group, a phosphoric acid group, a hydroxyl group and a phenolic hydroxyl group. One of these functional groups may be used, or two or more thereof may be used in combination.

Particularly a carboxylic acid group is preferable as the acidic functional group, and examples of the monomer having a carboxylic acid group include monocarboxylic acids such as acrylic acid, methacrylic acid and crotonic acid, derivatives thereof, dicarboxylic acids such as maleic acid, fumaric acid, itaconic acid and citraconic acid, acid anhydrides, and derivatives thereof. One of these functional groups may be used, or two or more thereof may be used in combination. Among them, dicarboxylic acid is preferable, and maleic acid is especially preferable.

The shape of the organic resin may be a particle shape, or a non-particle shape. Examples of the shape of particles include a spherical shape, a tabular shape, an acicular shape, a rod shape and an elliptic shape, and the fine particles may have any of these shapes, but among them, a spherical shape is preferable from the viewpoint of surface modification property, dispersibility and coatability. In addition, the organic resin may have a particle shape when being in the state of a coating liquid before formation of the porous layer, form a film under heat during formation of the porous layer, and have a film shape rather than a particle shape. Alternatively, the organic resin may partially form a film to connect adjacent particles by the film.

Fluororesin

Examples of the fluororesin that form the porous layer include homopolymers such as polyvinylidene fluoride, polytetrafluoroethylene, polyvinyl fluoride and polychlorotrifluoroethylene; and copolymers such as ethylene-tetrafluoroethylene polymers and ethylene-chlorotrifluoroethylene polymers. Examples of the fluororesin also include copolymers of a homopolymer and tetrafluoroethylene, hexafluoropropylene, trifluoroethylene or the like. Among these fluororesins, a polyvinylidene fluoride resin, particularly a resin composed of a copolymer of vinylidene fluoride and hexafluoropropylene is suitably used from the viewpoint of electric stability and oxidation resistance.

The vinylidene fluoride content of the polyvinylidene fluoride resin is preferably 80 mol % or more and 100 mol % or less. The vinylidene fluoride content is more preferably 85 mol % or more and 99 mol % or less. The vinylidene fluoride content is still more preferably 90 mol % or more and 98 mol % or less. When the vinylidene fluoride content is less than 80 mol %, it may be impossible to obtain sufficient dynamic strength.

The melting point of the polyvinylidene fluoride resin is preferably 130° C. or higher. The melting point of the polyvinylidene fluoride resin is more preferably 130° C. or higher and lower than 180° C., still more preferably 140° C. or higher and lower than 180° C.

The weight average molecular weight of the fluororesin is preferably 100,000 or more and 5,000,000 or less. The weight average molecular weight of the fluororesin is more preferably 300,000 or more and 4,000,000 or less. The weight average molecular weight of the fluororesin is still more preferably 600,000 or more and 3,000,000 or less. The weight average molecular weight of the fluororesin is especially preferably 800,000 or more and 2,500,000 or less. When the weight average molecular weight is less than 100,000, it may be impossible to obtain sufficient adhesiveness with an electrode. In addition, when the weight average molecular weight is more than 5,000,000, handling characteristics and coatability may be deteriorated due to an increase in viscosity.

In addition, a plurality of fluororesins may be mixed in the fluororesin. When a plurality of fluororesins are mixed, the weight average molecular weight of a combination of a plurality of fluororesins is preferably 100,000 or more and 5,000,000 or less. However, for example, in core-shell-type particles in which the fluororesin forms the shell, and another fluororesin forms the core, the weight average molecular weight of another fluororesin is not necessarily 100,000 or more and 5,000,000 or less.

The fluororesin may have a particle shape, with the average particle size being preferably 0.01 μm or more and 1.00 μm or less. The average particle size is more preferably 0.02 μm or more and 0.40 μm or less. The average particle size of the organic resin fine particles is further preferably 0.04 μm or more and 0.20 μm or less. When the average particle size is less than 0.01 μm, fluororesin particles may be densely stacked to significantly increase the air permeability. When the average particle size is more than 1.00 μm or more, it may be impossible to obtain sufficient wet adhesiveness because the contact area with an electrode decreases. In addition, the distance between inorganic particles may increase, resulting in deterioration of dimensional stability.

The average particle size here is one determined by measuring the length of one side of a square or the long side (major axis diameter) of a rectangle that fully surrounds a fluororesin particle observed by microscopic observation of the surface of the porous layer, and calculating the number average thereof as described in examples. The measurement method will be described in detail later.

Examples of the shape of the fluororesin particles include a spherical shape, a tabular shape, an acicular shape, a rod shape and an elliptic shape, and the organic resin fine particles may have any of these shapes. Among them, a spherical shape and a tabular shape are especially preferable from the viewpoint of dispersibility, coatability and pore formation.

The aspect ratio of the fluororesin particle is preferably 100 or less, more preferably 50 or less, further preferably 30 or less. When the aspect ratio is more than 100, the handling characteristics of fluororesin particles may be deteriorated.

The aspect ratio is a value determined by drawing a square or rectangle that fully surrounds a particle on an image of the particle obtained with an electronic microscope, and dividing the long side (major axis diameter) of the rectangle by the short side (minor axis diameter) of the rectangle. When a square is drawn, the aspect ratio is 1.

As a method of producing the fluororesin particles, a known method such as emulsification polymerization, suspension polymerization, and dispersion polymerization can be used. Processing may be further performed to ensure that fluororesin particles obtained by the production method have a desired average particle size and shape. Examples thereof include a coagulation method, a phase separation method, a dry grinding method, a wet grinding method and a spray dryer method.

Examples of the coagulation method include a method in which a fluororesin is dissolved in a solvent, or a solvent and water, and the fluororesin solution is added to a poor solvent to precipitate fluororesin particles.

For example, the solvent to be used to dissolve the fluororesin may be a solvent that can dissolve a fluororesin and mix with water.

Specific examples of the solvent include N-alkyl pyrrolidone-based solvents such as N-methyl-2-pyrrolidone (hereinafter, sometimes abbreviated as NMP); urea-based solvents such as 1,3-dimethyl-2-imidazolidinone (hereinafter, sometimes abbreviated as DMI); chain amide-based solvents such as N,N-dimethylacetamide (hereinafter, sometimes abbreviated as DMAc) and N,N-dimethylformamide (hereinafter, sometimes abbreviated as DMF); sulfur oxide-based polar solvents such as dimethyl sulfoxide (hereinafter, sometimes abbreviated as DMSO), dimethyl sulfone and tetramethylene sulfone; ketone-based solvents such as acetone and methyl ethyl ketone; and nitrile-based solvents such as acetonitrile and propionitrile. Among them, NMP, DMI, acetone, methyl ethyl ketone and acetonitrile are preferable, and NMP and acetonitrile are more preferable from the viewpoint of stability of a solvent and ease of handling on an industrial scale.

Preferably, the atmosphere of a dissolver has a low oxygen gas concentration for suppressing decomposition and degradation of a fluororesin. Thus, it is preferable to dispose the dissolver under an inert gas atmosphere. Examples of the inert gas include nitrogen gas, carbon dioxide gas, helium gas and argon gas. In view of economy and availability, nitrogen gas, argon gas and carbon dioxide gas are preferable. Nitrogen gas or argon gas is especially preferably used.

The dissolution method is not particularly limited, but when a fluororesin solution is to be prepared, a fluororesin, a solvent and water are added in a predetermined vessel, and the fluororesin is dissolved with stirring. When the fluororesin is not dissolved at normal temperature, it is heated, and thereby dissolved.

The fluororesin may be dissolved in a solvent, followed by adding water. When water is added after the fluororesin is dissolved, a fluororesin solution is prepared in a predetermined vessel, and water is then added to the fluororesin solution. A liquid delivery pump, a Komagome pipet or the like can be used for addition of water. It is preferable to slowly add water because when a large amount of water is added at a time, the fluororesin is precipitated, and it takes much time to dissolve the fluororesin. To produce fluororesin particles uniform in particle size, it is preferable that the fluororesin is fully dissolved in a solvent, and the resulting solution is then added or flash-crystallized to a poor solvent to precipitate fluororesin fine particles. An undissolved fluororesin may exist.

The amount of water added varies depending on the concentration of the fluororesin to be dissolved, and the type of solvent. The amount of water to be added is preferably 1% by mass or more and 25% by mass or less based on 100% by mass of the total amount of the solvent and the water to be added. When the amount of water to be added is excessively small, deformed particles may be generated, and when the amount of water to be is excessively large, the fluororesin may be precipitated.

The dissolution temperature varies depending on the type of solvent to be used and the concentration of the fluororesin. The dissolution is normally normal temperature to 200° C., preferably normal temperature to 100° C., or equal to or higher than the boiling point of the solvent.

Dissolution time varies depending on the type of solvent, the concentration of the fluororesin, and the dissolution temperature. The dissolution time is normally 5 minutes to 50 hours, preferably 10 minutes to 40 hours.

When the concentration of the fluororesin is high, fusion of fluororesin particles occurs at the time of adding a fluororesin solution to a poor solvent to precipitate fluororesin particles. Thus, it may be impossible to obtain fluororesin particles having a small particle size or fluororesin particles uniform in particle size.

Thus, the amount of the fluororesin in the fluororesin solution is preferably 0.1% by mass or more and 15% by mass or less based on 100% by mass of the solvent when water is absent, or based on 100% by mass of the total of the solvent and water when water is present. The amount of the fluororesin is more preferably 0.5% by mass or more and 10% by mass or less.

The poor solvent will be described later in detail.

The amount of the fluororesin in the fluororesin solution is preferably 0.1% by mass or more and 15% by mass or less based on 100% by mass of the total of the solvent and water because applicability to industrial production is improved. In this example, the fluororesin is dissolved in the solvent, or the solvent and water, and the fluororesin solution is then subjected to a precipitation step.

The precipitation step is the following step a1 or step a2 in particular.

(Step a1): adding a fluororesin solution to a poor solvent to precipitate fluororesin particles.

(Step a2): flash-crystallizing a fluororesin solution to a poor solvent to precipitate fluororesin particles.

In the step a1, a fluororesin solution is added to a poor solvent for a fluororesin to precipitate fluororesin particles. For adding the fluororesin solution to a poor solvent for the fluororesin, the fluororesin solution may be injected continuously or added dropwise from a vessel containing the fluororesin solution to a vessel containing the poor solvent for the fluororesin (hereinafter, sometimes referred to as a "reception tank"). In addition, the fluororesin solution may be added from above the poor solvent through a gas phase. It is preferable to add the fluororesin solution directly into the poor solvent from the viewpoint of obtaining particles that are minute and uniform in particle size.

Methods of preparing fluororesin particles by bringing a fluororesin and a poor solvent into contact with each other include two methods: a method in which a particle-forming liquid is prepared by adding a fluororesin solution in a reception tank containing a poor solvent, and the particle-forming liquid is then discharged, and subjected to a next step (batch method); and a continuous flow method (sometimes referred to simply as a continuous method). Reactors to be used in the continuous flow method include a continuous stirred tank reactor (abbreviated name: CSTR) and a plug flow reactor (abbreviated name: PFR). Either of the reactors is applicable for forming the fluororesin into particles.

The method using a CSTR is a method in which a poor solvent is added in a reception tank (sometimes referred to as a reactor in the continuous method), a fluororesin solution is added thereto to prepare fluororesin particles and, subsequently, the fluororesin solution and the poor solvent are simultaneously added dropwise to the resulting particle-forming liquid while a fluororesin particle-forming liquid is continuously discharged from the reception tank so that particles are formed continuously. A particle-forming liquid can also be prepared by simultaneously adding a fluororesin solution and a poor solvent dropwise to a fluororesin particle-forming liquid prepared by a batch method while continuously discharging the fluororesin particle-forming liquid from a reception tank.

When a CSTR is used, it is preferable to add a fluororesin solution and a poor solvent simultaneously. The ratio of the dropwise addition rate of the poor solution to the dropwise addition rate of the fluororesin solvent is not particularly limited as long as fluororesin particles can be generated, but the ratio of the dropwise addition rate of the poor solvent to the dropwise addition rate of the fluororesin solution is preferably 0.1 to 100, more preferably 0.2 to 50.

The ratio of the mass of a particle-forming liquid in a reception tank (reactor) to the flow rate at which the particle-forming liquid is discharged from the reception tank is a retention time. The retention time is not particularly limited as long as particles that are minute and uniform in particle size are obtained, and the retention time is preferably 1 second to 10 hours, more preferably 1 minute to 1 hour.

A mixing device may be installed in the reception tank to retain uniformity of the particle-forming liquid. The mixing device may be, for example, a stirring blade, a twin-screw mixer, a homogenizer or an ultraviolet wave irradiator.

The method using a PFR is a method in which a fluororesin solution and a poor solvent are fed into a tube at a constant rate, the fluororesin and the poor solvent are mixed to form particles in the tube, and a particle-forming liquid is continuously taken out. Various tubes can be used in this method. For example, two tubes can be used, where a fluororesin solution is fed into an inner tube, a poor solvent is fed into an outer tube, and the fluororesin solution and the poor solvent are mixed to form particles in the outer tube. The fluororesin may be fed into the outer tube, while the poor solvent is fed into the inner tube.

When particles are formed continuously using one tube, e.g. a T-shaped tube, a poor solvent can be fed in a direction at 90 degrees to the flow of a fluororesin solution so that the fluororesin solution and the poor solution come into contact with each other to form particles.

The method using a PFR is not limited to the method described above because particles can be formed continuously by mixing a fluororesin solution and a poor solvent using various tubes.

When a PFR is used, the fluororesin solution feeding rate and the poor solvent feeding rate are not particularly limited as long as fluororesin particles can be generated. From the viewpoint of productivity, the ratio of the fluororesin solution feeding rate to the poor solvent feeding rate is preferably 0.1 to 100, more preferably 0.2 to 50.

The section in which the fluororesin solution and the poor solvent are mixed may be a tube alone, or a tubular mixing device may be installed. Examples of the tubular mixing device may include the above-mentioned mixing devices, and tubular mixing devices containing a static mixing structure such as a static mixer.

The time of mixing the fluororesin solution and the poor solvent may be in the same range as that of the above-mentioned retention time. The inner diameter of the tube is not particularly limited as long as the fluororesin solution and the poor solvent can be mixed. From the viewpoint of productivity, the inner diameter of the tube is preferably 0.1 mm to 1 m, more preferably 1 mm to 1 m.

When two tubes: an inner tube and an outer tube are used, the ratio of the inner tube diameter and the outer tube diameter is not particularly limited as long as a particle-forming liquid can be prepared. The ratio of outer tube diameter/inner tube diameter is preferably 1.1 to 500, more preferably 1.1 to 100.

Examples of the poor solvent for fluororesin particles include aliphatic hydrocarbon-based solvents such as pentane, hexane, heptane, octane, nonane and decane; aromatic hydrocarbon-based solvents such as benzene, toluene, o-xylene, m-xylene, p-xylene and naphthalene; ester-based solvents such as ethyl acetate, methyl acetate, butyl acetate and butyl propionate; ether-based solvents such as diethyl ether, diisopropyl ether, tetrahydrofuran and dioxane; alcohol-based solvents such as methanol, ethanol, 1-propanol and 2-propanol; and water.

Alcohol-based solvents such as methanol, ethanol, 1-propanol or 2-propanol, water and so on are preferable. Methanol, ethanol and water are especially preferable.

To uniformly disperse fluororesin particles in the poor solvent, the poor solvent for the fluororesin is preferably a solvent that uniformly mixes with a solvent to be used for dissolution. The term "uniformly mixes with a solvent" means that when two or more solvents are mixed, an interface does not appear even after the mixture is left standing for 1 day. Examples of the solvent that uniformly mixes with water may include NMP, DMF, DMAc, acetone, DMSO, tetrahydrofuran, acetonitrile, methanol and ethanol.

As the poor solvent for the fluororesin, a single solvent may be used, or two or more solvents may be used in combination as long as the poor solvent uniformly mixes with a solvent to be used for dissolution. It is preferable to use a mixed solvent containing water such as a mixed solvent of water and an alcohol or water and a nitrile particularly because particles that are minute and uniform in particle size are easily obtained.

The use amount of the poor solvent for the fluororesin is not particularly limited, and may be, for example, 0.1 parts by mass or more and 100 parts by mass or less based on 1 part by mass of the solvent that is used for dissolution. The use amount of the poor solvent for the fluororesin is preferably 0.1 parts by mass or more and 50 parts by mass or less, more preferably 0.1 parts by mass or more and 10 parts by mass or less.

When the fluororesin solution is added in the poor solvent for the fluororesin, the reception tank temperature can be set to a temperature of 0° C. or higher and the boiling point of the poor solvent or lower. It may be impossible to obtain particles because fusion of particles occurs depending on a solvent to be used and, therefore, the reception tank temperature immediately before addition of the fluororesin solution is preferably 0° C. or higher and 40° C. or lower. The addition of the fluororesin solution causes fluororesin particles to be precipitated from the fluororesin solution so that a liquid with fluororesin particles dispersed or suspended therein is obtained. Preferably, the poor solvent for the fluororesin is stirred in addition of the fluororesin solution.

In the step a2, the dissolved fluororesin solution is flash-crystallized to precipitate fluororesin particles. That is, a flash crystallization method is used in the method in which a fluororesin solution is added to a poor solvent. The flash crystallization is a method in which a fluororesin solution is rapidly solidified/crystallized. More specifically, the flash crystallization is a method in which a fluororesin solution under heating and pressurization is ejected through a nozzle and transferred into another vessel (hereinafter, sometimes referred to as a reception tank) at a temperature lower than the boiling point of a solvent used for dissolution (may be equal to or lower than normal temperature) and at a pressure lower than a pressure at which the fluororesin solution is pressurized (may be under reduced pressure) so that the solution is crystallized, or a fluororesin solution under pressurization is ejected through a nozzle and transferred into another vessel (hereinafter, sometimes referred to as a reception tank) at a pressure lower than a pressure at which the fluororesin solution is pressurized (may be under reduced pressure) so that the solution is crystallized.

Preferably, the fluororesin solution is directly ejected to the poor solvent at the time when flash crystallization is performed. Preferably, flash crystallization is performed while the tip of a nozzle through which the fluororesin solution is ejected is held in the poor solvent on the reception tank side. Flash crystallization may be performed from above the poor solvent through a gas phase while the tip of the nozzle is kept away from the poor solvent.

This will be described in detail. Preferably, flash crystallization is performed by ejecting the fluororesin solution to the reception tank under atmospheric pressure (may be under reduced pressure) from a vessel kept under heating and pressurization or under pressurization. When heating/dissolution is performed in a heat-resistant vessel such as an autoclave, for example, in the dissolution step, the inside of the vessel is brought into a pressurized state by a self-generated pressure due to heating (may be further pressurized with an inert gas such as nitrogen). When in this state, the pressure is released into the reception tank under atmospheric pressure, flash crystallization can be further easily and conveniently performed. When the fluororesin is dissolved at normal temperature, fluororesin particles can be obtained by pressurizing the dissolution tank to a certain pressure, and flash-crystallizing the solution into the poor solvent for the fluororesin.

The poor solvent to be used when the fluororesin solution is flash-crystallized into the poor solvent is not particularly limited, and one similar to the poor solvent described in the step a1 can be used.

The use amount of the poor solvent for the fluororesin is not particularly limited, and may be, for example, 0.1 parts by mass or more and 100 parts by mass or less based on 1 part by mass of the solvent used for dissolution. The use amount of the poor solvent is preferably 0.1 parts by mass or more and 50 parts by mass or less. The use amount of the poor solvent is more preferably 0.1 parts by mass or more and 10 parts by mass or less.

For operating conditions during flash crystallization, a method can be employed in which a solution with a fluororesin dissolved normally at normal temperature to 200° C., preferably at normal temperature to 100° C. is flash-crystallized in a single stage in a vessel at a pressure lower than a pressure at which the solution is pressurized, the pressure being in a range as described later, or under reduced pressure, or the solution is flash-crystallized in multiple stages in a vessel at a pressure lower than that of the inside of the tank containing the solution. Specifically, when heating/dissolution is performed in a heat-resistant vessel such as an autoclave, for example, in the dissolution step, the inside of the vessel is brought into a pressurized state by a self-generated pressure under heating (an increase in pressure by heating) (may be further pressurized with an inert gas such as nitrogen). The solution in a pressurized state is flashed to a reception tank under atmospheric pressure or under reduced pressure, the reception tank containing a poor solvent for the fluororesin. When the fluororesin is dissolved without being heated in a pressure-resistant vessel such as an autoclave, the solution pressurized to a certain pressure and thereby brought into a pressurized state is flashed to a reception tank under atmospheric pressure or under reduced pressure, the reception tank containing a poor solvent for the fluororesin. The pressure (gauge pressure) of the solution to be flash-crystallized is preferably 0.2 MPa or more and 4 MPa or less. Preferably, the solution in this environment is flash-crystallized to a reception tank under atmospheric pressure.

The temperature of the reception tank varies depending on the poor solvent for the fluororesin, which is added in the reception tank, and it is preferably a temperature which does not cause solidification of the poor solvent for the fluororesin and which is not higher than 50° C. Specifically, in water, the temperature of the reception tank is preferably 0° C. to 50° C. as a temperature immediately before flash crystallization.

In the flash crystallization method, a connection tube outlet from the dissolution tank is placed in the air or the poor solvent for the fluororesin in the reception tank, and flash crystallization is performed. It is preferable to add the fluororesin solution into a poor solvent because finer fluororesin particles can be obtained.

Fluororesin particles prepared in the precipitation step (step a1), or particularly (step a2), can be obtained in the form of a dispersion liquid or a suspension liquid. When coarse particles such as an undissolved part of the added fluororesin are contained, these coarse particles can be removed by filtration or the like.

By employing the method of this example, fluororesin particles that are minute and uniform in particle size can be stably produced. By using fluororesin particles, particularly polyvinylidene fluoride resin particles composed of a copolymer of vinylidene fluoride and hexafluoropropylene, wet adhesiveness can be improved without reducing the air permeability.

Examples of the phase separation method include a method in which a fluororesin is dissolved in a solvent, and the fluororesin solution is emulsified using a nonsolvent, and brought into contact with a poor solvent to form fluororesin particles.

Examples of the dry grinding method include a method in which fluororesin particles are mutually collided to grind the particles, and a method in which fluororesin particles are collided against a metallic wall to grind the particles.

Examples of the wet grinding method include a method in which beads of zirconia and the like are added to a dispersion medium with fluororesin particles dispersed therein, and the dispersion medium is stirred so that beads are collided against the fluororesin particles to grind the particles. The material and bead diameter of the beads can be matched to the shape and size of intended fluororesin particles.

Examples of the spray dryer method include a method in which a fluororesin is dissolved in a solvent, the resulting solution is sprayed through a nozzle to prepare droplets, and the droplets are dried to be formed into particles. The solvent to be used in the spray dryer method is not particularly limited as long as it dissolves a fluororesin, but a solvent having a boiling point lower than the melting point of the fluororesin is preferable, and specific examples thereof include acetone, methyl ethyl ketone, methyl isobutyl ketone, methanol, ethanol, 1-propanol, 2-propanol, 1-butanol, ethyl acetate, propyl acetate, butyl acetate, tetrahydrofuran and cyclohexanone.

Inorganic Particles

Preferably, the porous layer contains inorganic particles for improving the dimensional stability of the secondary battery separator. The secondary battery separator is required to have dimensional stability which ensures that the thermal shrinkage is 10% or less at 130° C. after 1 hour. Inorganic particles are required to be electrically stable in a battery, and have electrically insulating quality and heat resistance.

Specific examples of the inorganic particles include inorganic fine particles such as inorganic oxide particles such as those of aluminum oxide, boehmite, silica, titanium oxide, zirconium oxide, iron oxide and magnesium oxide, inorganic nitride particles such as those of aluminum nitride and silicone nitride and hardly soluble ionic crystal particles such as those of calcium fluoride, barium fluoride and barium sulfate. One type of these particles may be used, or two or more types thereof may be used in combination.

The average particle size of inorganic particles to be used is preferably 0.10 μm or more and 5.0 μm or less. The average particle size of inorganic particles is more preferably 0.20 μm or more and 3.0 μm or less, still more preferably 0.30 μm or more and 1.0 μm or less. When the average particle size is less than 0.10 μm, the porous layer may be densified to increase the air permeability. The pore diameter decreases so that the impregnation property of the electrolyte solution may be reduced to affect productivity. When the average particle size is more than 5.0 μm, it may be impossible to obtain sufficient dimensional stability, and the thickness of the porous layer may increase, resulting in deterioration of battery characteristics.

Examples of the shape of particles to be used include a spherical shape, a tabular shape, an acicular shape, a rod shape and an elliptic shape, and the fine particles may have any of these shapes. Among them, a spherical shape is preferable from the viewpoint of surface modification property, dispersibility and coatability.

Binder

A binder may be used when it is necessary to bind the fluororesins, the organic resins, the inorganic particles, the fluororesin and the organic resin, the fluororesin and the inorganic particles, the organic resin and the inorganic particles, and the porous base material and each of the fluororesin, the organic resin and the inorganic particles. In addition, wet adhesiveness with an electrode, dry adhesiveness with an electrode and dimensional stability may be improved by adding a binder.

Examples of the resin to be used in the binder include fluororesins, acrylic resins, styrene-butadiene resins, cross-linked polystyrenes, methyl methacrylate-styrene copolymers, polyamides, polyamideimides, polyimides, melamine resins, phenol resins, polyacrylonitriles, silicon resins, polycarbonates and carboxymethylcellulose resins, and these resins may be used alone, or may be used in combination of two or more thereof. Among the above-mentioned binder resins, fluororesins, acrylic resins, styrene-butadiene resins and carboxymethylcellulose resins are preferably used from the viewpoint of electric stability and oxidation resistance. Particularly, fluororesins and acrylic resins are preferable.

In addition, a heat-resistant resin such as polyamide, polyamideimide, polyimide, polyether imide, polyvinylidene fluoride, a vinylidene fluoride-hexafluoropropylene copolymer, polytetrafluoroethylene, polysulfone, polyketone, polyether ketone, polycarbonate or polyacetal may be added for improving dimensional stability. The heat-resistant resin means a resin having a melting point of 150° C. or higher, or a resin having substantially no melting point. The resin having a melting point of 150° C. or higher refers to a resin having the peak top of 150° C. or higher. The resin having no melting point refers to a resin which does not have the peak top at a measurement temperature of −20 to 230° C.

In addition, the binder to be used may be a binder soluble in a solvent, or a particle-shaped binder, and the form thereof is not particularly limited.

The particle-shaped binder may be one that partially or totally forms a film during formation of a porous layer, or may be one that does not form a film. As a method of causing a particle-shaped binder to form a film, the binder may be caused to form a film by heat in drying of a solvent, or the binder may be caused to form a film by adding a film formation promoting agent such as N-methyl-2-pyrrolidone, dimethylacetamide, dipropylene glycol methyl ether, butyl glycol, propylene glycol or 2,2,4-trimethyl-1,3-pentanediol monoisobutylate.

The average particle size of the particle-shaped binder is preferably 1 μm or less. When the average particle size is more than 1 μm, battery performance may be deteriorated because of the amount of the binder necessary for binding.

The content of the binder is preferably 0.1 parts by mass or more and 100 parts by mass or less, more preferably 0.2 parts by mass or more based on 100 parts by mass of the total amount of the fluororesin, the organic resin and the inorganic particles. The content of the binder is more preferably 50 parts by mass or less, still more preferably 30 parts by mass or less. When the content of the binder is more than 100 parts by mass, the content of the fluororesin and the organic resin decreases so that the contact area with the electrode decreases, leading to deterioration of wet adhesiveness and dry adhesiveness. In addition, the air permeability may significantly increase to deteriorate battery characteristics. When the binder content is less than 0.1 parts by mass, it is hard to exhibit binding property so that the fluororesin resin and inorganic particles stacked on the porous base material may be detached, thus making it difficult to form a porous layer.

Formation of Porous Layer

A secondary battery separator is a separator including: a porous base material; and a porous layer stacked on at least one surface of the porous base material, the porous layer being mainly composed of inorganic particles, and two or more organic resins having different melting points, the porous layer including a fluororesin as at least one of the organic resins, the secondary battery separator satisfying at least one of the following requirements (A) and/or (B). The method will be described.

(A) the porous layer has a melting point of 130° C. or higher and 20° C. or higher and lower than 130° C.; and
(B) The porous layer has a melting point of 130° C. or higher and has an amorphous organic resin.

A fluororesin produced by a known method such as emulsification polymerization, suspension polymerization or dispersion polymerization, or fluororesin particles and inorganic particles processed to have an intended average particle size and shape after polymerization are dispersed in a solvent to prepare a coating liquid. The solvent in which the fluororesin or the inorganic particles are dispersed is preferably a solvent mainly composed of water to inhibit the porous base material from being impregnated with the solvent. The term "mainly composed of water" means that 50% by mass or more of water is contained in 100% by mass of a solvent.

The ratio of water to the solvent mainly composed of water is preferably 50% by mass or more, more preferably 60% by mass or more, further preferably 70% by mass or more. When the ratio of water is less than 50% by mass, the porous base material may be impregnated with a coating liquid in application of the coating liquid to the base material to make it unable to form a desired porous layer. When the porous base material is impregnated with a coating liquid, it may be difficult to convey the porous base material, leading to generation of creases during conveyance.

When the fluororesin, the organic resin and inorganic particles are dispersed, a dispersant may be used if necessary. The type of the dispersant is not particularly limited, and examples of the dispersant include cationic surfactants such as alkyl amine salts and quaternary ammonium salts; anionic surfactants such as alkyl sulfuric acid ester salts, polyoxyethylene alkyl ether sulfuric acid ester salts, alkyl benzenesulfonic acid salts and fatty acid salts; nonionic surfactants such as polyoxyethylene alkyl ethers, polyoxyethylene alkyl phenols, glycerin fatty acid esters and polyoxyethylene fatty acid esters; amphoteric surfactants such as alkylbetaines and alkylamine oxides; and cationic, anionic, nonionic and amphoteric fluorine-based surfactants and silicon-based surfactants. In addition, examples of the dispersant include polymer compounds such as polyvinyl pyrrolidone, polycarboxylic acid salts, polysulfonic acid salts and polyether. One of these dispersants may be used, or two or more thereof may be used in combination.

The added amount of the dispersant is preferably 0.1 parts by mass or more and 40 parts by mass or less, more preferably 0.2 parts by mass or more, still more preferably 0.5 parts by mass or more based on 100 parts by mass of the fluororesin, organic resin and inorganic particles to be dispersed. In addition, the added amount of the dispersant is preferably 30 parts by mass or less, more preferably 20 parts by mass or less. When the added amount of the dispersant is more than 40 parts by mass, the content of the fluororesin relative to the porous layer may decrease, leading to deterioration of wet adhesiveness and dry adhesiveness.

As a method of dispersing the fluororesin, the organic resin and inorganic particles, a known method may be used. Examples of the method include methods using a ball mill, a bead mill, a sand mill, a roll mill, a homogenizer, an ultrasonic homogenizer, a high-pressure homogenizer, an ultrasonic apparatus, a paint shaker or the like. Two or more of these mixing and dispersing machines may be combined to perform dispersion in steps.

The order of preparing a coating liquid is not particularly limited. From the viewpoint of improving efficiency of the dispersion step, it is preferable that a dispersant is added to a solvent mainly composed of water, the mixture is mixed, and the fluororesin, the organic resin and inorganic particles are added in the resulting solution to prepare a coating liquid.

If necessary, the binder may be added to the coating liquid for bonding the particles or particles and the porous base material. An antioxidant, a stabilizer, an antifoaming agent, a levelling agent and the like may be appropriately added to the coating liquid if necessary.

The type of the leveling agent is not particularly limited, and examples of the dispersant include cationic surfactants such as alkyl amine salts and quaternary ammonium salts; anionic surfactants such as alkyl sulfuric acid ester salts, polyoxyethylene alkyl ether sulfuric acid ester salts, alkyl benzenesulfonic acid salts and fatty acid salts; nonionic surfactants such as polyoxyethylene alkyl ethers, polyoxyethylene alkyl phenols, glycerin fatty acid esters and polyoxyethylene fatty acid esters; amphoteric surfactants such as alkylbetaines and alkylamine oxides; and cationic, anionic, nonionic and amphoteric fluorine-based surfactants, silicon-based surfactants, and polymer compounds such as polyvinylpyrrolidone, polycarboxylic acid salts, polysulfonic acid salts and polyether.

The added amount of the leveling agent is preferably 20 parts by mass or less, more preferably 10 parts by mass or less, still more preferably 5 parts by mass or less based on 100 parts by mass of the fluororesin, the organic resin and inorganic particles. When the added amount of the leveling agent is more than 20 parts by mass, battery characteristics may be deteriorated due to reduction of adhesiveness and side reactions in the secondary battery.

Next, the obtained coating liquid is applied onto the porous base material, and dried to stack a porous layer. As a coating method, coating may be performed by a known method. For example, gravure coating, slit die coating, knife coating, kiss coating, roll coating, bar coating, spray coating, immersion coating, spin coating, screen printing, inkjet printing, pat printing and other types of printing can be used. The coating method is not limited thereto, and a coating method may be selected in accordance with preferred conditions for a fluororesin, an organic resin, inorganic particles, a binder and leveling agent to be used, and a solvent and a base material to be used. For improving coatability, for example, the coating surface of the porous base material may be subjected to a surface treatment such as a corona treatment or a plasma treatment.

When the porous layer is to be stacked on both surfaces of the porous base material, one surface may be coated and dried, followed by coating and drying the other surface. It is preferable to coat and dry both surfaces at the same time from the viewpoint of high productivity.

From the viewpoint of wet adhesiveness and dry adhesiveness, it is preferable to stack the porous layer on both surfaces rather than stacking the porous layer on only one surface because wet adhesiveness and dry adhesiveness are secured on both positive electrode and negative electrode sides, resulting in excellent cycle performance.

The ratio of the organic resin having a melting point of 130° C. or higher in the porous layer is preferably 1% by mass or more and 90% by mass or less, more preferably 5% by mass or more and 70% by mass or less based on 100% by mass of the total of the porous layer. The ratio of the organic resin is still more preferably 10% by mass or more and 50% by mass or less. When the ratio of the fluororesin in the porous layer is less than 1% by mass, it may be impossible to obtain sufficient wet adhesiveness. In addition, when the ratio of the fluororesin is more than 90% by mass, it may be impossible to obtain sufficient dimensional stability because the content of inorganic particles decreases.

The ratio of the organic resin having a melting point of 20° C. or higher and lower than 130° C. or higher in the porous layer is preferably 1% by mass or more and 90% by mass or less, more preferably 5% by mass or more and 70% by mass or less based on 100% by mass of the total of the porous layer. The ratio of the organic resin is still more preferably 10% by mass or more and 50% by mass or less. When the ratio of the organic resin having a melting point of 20° C. or higher and lower than 130° C. in the porous layer is less than 1% by mass, it may be impossible to obtain sufficient dry adhesiveness. In addition, when the ratio of the fluororesin is more than 90% by mass, it may be impossible to obtain sufficient dimensional stability because the content of inorganic particles decreases.

From the viewpoint of wet adhesiveness and dry adhesiveness with an electrode, it is preferable that the fluororesin and the organic resin are present as mutually independent constituent units, e.g. fluororesin particles and organic resin particles or fluororesin particles and an organic resin film rather than being present as the same constituent unit, e.g. a mixed fluororesin and organic resin in the same particle.

The thickness of the porous layer is preferably 0.10 µm or more and 5.0 µm or less. The thickness of the porous layer is more preferably 0.3 µm or more and 4.0 µm or less. The thickness of the porous layer is still more preferably 0.5 µm or more and 3.0 µm or less. When the thickness of the porous layer is less than 0.10 µm, it may be impossible to obtain sufficient wet adhesiveness and dry adhesiveness with an electrode. In addition, when the thickness of the porous layer is more than 5.0 µm, the air permeability may significantly increase, or wet adhesiveness and dry adhesiveness may be insufficient. When the porous layer is stacked on only one surface, the separator may be significantly curved, and for this reason, it is preferable to stack the porous layer on both surfaces of the porous base material. When the porous layer is stacked on both surfaces, the difference in thickness between the porous layers on the surfaces is preferably 1 µm or less for the same reason as described above.

The air permeability increases by a factor of preferably 5 or less, more preferably 3 or less as a result of stacking the porous layer. When the air permeability increases by a factor of more than 5 as a result of stacking the porous layer, the air permeability of the secondary battery separator as a whole also increases so that sufficient ion movability is not obtained, and thus battery characteristics may be deteriorated.

Porous Base Material

Examples of the porous base material include porous films having pores therein, nonwoven fabrics, and porous film sheets made of fibrous materials, and the like. Preferably, the material that forms the porous base material is composed of a resin which is electrically insulating, electrically stable and stable to an electrolyte solution. The resin to be used for imparting a shutdown function is preferably a thermoplastic resin having a melting point of 200° C. or lower. The shutdown function here is a function in which if abnormal heat generation occurs in a lithium ion battery, the material is melted by heat to close the porous structure so that ion movement is stopped to stop power generation.

Examples of the thermoplastic resin include polyolefin resins, and the porous base material is preferably a polyolefin porous base material. The polyolefin porous base material is more preferably a polyolefin-based porous base material having a melting point of 200° C. or lower. Specific examples of the polyolefin resin include polyethylene, polypropylene, copolymers thereof, and mixtures obtained by combination thereof, and the porous base material is, for example, a monolayer porous base material containing 90% by mass or more of polyethylene, or a multilayer porous base material composed of polyethylene and polypropylene.

Examples of the method of producing the porous base material include a method in which a polyolefin resin is formed into a sheet, and the sheet is then made porous by stretching the sheet, and a method in which a polyolefin resin is dissolved in a solvent such as liquid paraffin, and formed into a sheet, and the sheet is then made porous by extracting the solvent.

The thickness of the porous base material is preferably 5 µm or more and 50 µm or less, more preferably 5 µm or more and 30 µm or less. When the thickness of the porous base material is more than 50 µm, the internal resistance of the porous base material may increase. When the thickness of the porous base material is less than 5 µm, production may be difficult, and it may be impossible to obtain sufficient dynamic characteristics.

The air permeability of the porous base material is preferably 50 seconds/100 cc or more and 1,000 seconds/100 cc or less. The air permeability of the porous base material is more preferably 50 seconds/100 cc or more and 500 seconds/100 cc or less. When the air permeability is more than 1,000 seconds/100 cc, sufficient ion movability is not obtained, and thus battery characteristics may be deteriorated. When the air permeability is less than 50 seconds/100 cc, it may be impossible to obtain sufficient dynamic characteristics.

Secondary Battery Separator

As described above, the secondary battery separator includes: a porous base material; and a porous layer stacked on at least one surface of the porous base material, the porous layer being mainly composed of inorganic particles, and two or more organic resins having different melting points, the porous layer including a fluororesin as at least one of the organic resins, the secondary battery separator satisfying at least one of the following requirements (A) and/or (B):

(A) the porous layer has a melting point of 130° C. or higher and 20° C. or higher and lower than 130° C.; and (B) The porous layer has a melting point of 130° C. or higher and has an amorphous organic resin.

Preferably, the stacked porous layer is made sufficiently porous to secure ion permeability, and the air permeability of the secondary battery separator is 50 seconds/100 cc or more and 1,000 seconds/100 cc or less. The air permeability of the porous base material is more preferably 50 seconds/100 cc or more and 500 seconds/100 cc or less. When the air permeability is more than 1,000 seconds/100 cc, sufficient ion movability is not obtained, and thus battery characteristics may be deteriorated. When the air permeability is less than 50 seconds/100 cc, it may be impossible to obtain sufficient dynamic characteristics.

Secondary Battery

The secondary battery separator can be suitably used in a secondary battery such as a lithium ion battery. A lithium ion battery has a configuration in which a secondary battery separator and an electrolyte are interposed between a positive electrode with a positive active material stacked on a positive electrode current collector and a negative electrode with a negative active material stacked on a negative electrode current collector.

The positive electrode includes a current collector, and a positive electrode material stacked on the current collector, the positive electrode agent including an active material, a binder resin and a conduction promoting agent. Examples of the active material include lithium-containing transition metal oxides having a layered structure such as $LiCoO_2$, $LiNiO_2$ and $Li(NiCoMn)O_2$; spinel type manganese oxides such as $LiMn_2O_4$; and iron-based compounds such as $LiFePO_4$. As the binder resin, a resin having high oxidation resistance may be used. Specific examples thereof include fluororesins, acrylic resins and styrene-butadiene resins. As the conduction promoting agent, a carbon material such as carbon black or graphite is used. As the current collector, a metal foil is suitable, and particularly, aluminum is often used.

The negative electrode includes a current collector, and a negative electrode material stacked on the current collector, the negative electrode agent including an active material and a binder resin. Examples of the active material include carbon materials such as artificial graphite, natural graphite, hard carbon and soft carbon; lithium alloy-based materials of tin, silicon and the like; metal materials such as Li; and lithium titanate ($Li_4Ti_5O_{12}$). As the binder resin, a fluororesin, an acrylic resin, a styrene-butadiene resin or the like is used. As the current collector, a metal foil is suitable, and particularly, a copper foil is often used.

The electrolyte solution provides a field where ions are moved between the positive electrode and the negative electrode in the secondary battery. The electrolyte solution has a configuration in which an electrolyte is dissolved in an organic solvent. Examples of the electrolyte include $LiPF_6$, $LiBF_4$ and $LiClO_4$, and $LiPF_6$ is suitably used from the viewpoint of solubility in an organic solvent, and ionic conductivity. Examples of the organic solvent include ethylene carbonate, propylene carbonate, fluoroethylene carbonate, dimethyl carbonate, diethyl carbonate, ethylmethyl carbonate, gamma-butyrolactone and sulfolane, and these organic solvents may be used in combination of two or more thereof.

As a method of preparing the secondary battery, first an active material and a conduction promoting agent are dispersed in a binder solution to prepare a coating liquid for an electrode, and the coating liquid is applied onto a current collector, and the solvent is dried to obtain a positive electrode and a negative electrode, respectively. The thickness of the coating film after drying is preferably 50 µm or more and 500 µm or less. A secondary battery separator is disposed between the obtained positive electrode and negative electrode such that the separator is in contact with the active material layer of each electrode, they are enclosed in a packaging material such as an aluminum laminated film, and an electrolyte solution is injected, followed by performing hot pressing. Thereafter, a negative electrode lead and a safety valve are installed, and the packaging material is sealed. The secondary battery thus obtained is excellent in cycle performance and dimensional stability because of high adhesiveness between the electrodes and the secondary battery separator, and can be produced at a low cost.

EXAMPLES

Hereinafter, our separators and batteries will be described in detail by way of examples, but this disclosure is not limited to the examples. The measurement methods used in examples will be shown below.
Measurement Methods
(1) Melting Point
In differential scanning calorimetry (DSC) performed in accordance with "JIS K 7121: 2012, "Method for Measurement of Transition Temperature of Plastic", 6 to 7 mg of a resin or porous layer as a measurement sample was placed in a measurement pan in a DSC (differential scanning calorimeter) manufactured by PerkinElmer, Inc., and the melting point was measured. The sample was heated, cooled, and then heated, and the temperature at a peak top of an endothermic peak at the time of the second heating was defined as a melting point.
Heating and cooling rate: ±10° C./min
Measurement temperature range: −20 to 230° C.
(2) Average Particle Size The surface of a porous layer was observed at a magnification of 50,000 using a field emission type scanning electron microscope (S-3400N manufactured by Hitachi, Ltd.). The image size here is 2.5 µm×1.8 µm. The number of pixels was 1,280×960, and the size of one pixel was 2.0 nm×1.9 nm.

For the average particle size, a square or rectangle completely surrounding one particle with the smallest area, i.e. a square or rectangle with the edge of a particle being in contact with four sides of the square or rectangle, was drawn on the obtained image, and the length of one side was defined as a particle size in a square, and the length of the long side (major axis diameter) was defined as a particle size in a rectangle. The particle size was measured for random 100 particles, and the number average thereof was defined as an average particle size. When 100 or more particles were observed in the photographed image, the number average of the particle sizes of random 100 particles in the image was defined as the average particle size, and when the number of particles observed in the image was less than 100, a plurality of images were photographed, and the number average of the particle sizes of total 100 particles was defined as the average particle size.
(3) Weight Average Molecular Weight Using a gel permeation chromatography method, the weight average molecular weight of the fluororesin was calculated in comparison with a calibration curve prepared with polystyrene.
Apparatus: LC-10A Series manufactured by Shimadzu Corporation
Column: two pieces of KD-806 M manufactured by Showa Denko K.K.
Mobile phase: dimethylformamide
Flow rate: 1.0 ml/min
Detection: differential refractometer
Column temperature: 40° C.
(4) Thickness of Porous Layer A sample section was cut out using a microtome, the section was observed with a field emission type scanning electron microscope (S-3400N manufactured by Hitachi, Ltd.), and the thickness of the porous layer at the highest point from the interface with the porous base material in the observation region was selected, and measured as the thickness of the porous layer. Random five spots in a sample having a size of 100 mm×100 mm were observed, selected and measured, and an average was calculated.
(5) Air Permeability One spot was randomly selected from each of three samples having a size of 100 mm×100 mm, the air permeability was measured in accordance with JIS P 8117 (2009) using an Oken type air permeability measurement apparatus (EG01-5-1MR manufactured by ASAHI SEIKO CO., LTD.), and the average thereof was defined as the air permeability (seconds/100 cc).

(6) Wet Adhesive Strength

A solvent with diethyl carbonate and ethylene carbonate mixed at a mass ratio of 7:3 was prepared, a secondary battery separator film (15 mm×100 mm) prepared in each of the following examples, and a positive electrode (15 mm×100 mm) including $LiCoO_2$ as an active material, a vinylidene fluoride resin as a binder, and carbon black as a conduction promoting agent were immersed in the solvent for 10 minutes, taken out, and then arranged such that the active material and the porous layer were in contact with each other, thermal pressing was performed at 0.5 MPa and 100° C. for 2 minutes using a thermal pressing machine, the positive electrode and the secondary battery separator film were manually separated from each other using a pair of tweezers, and the wet adhesive strength was evaluated on the following four grades. Similarly, the wet adhesive strength between the secondary battery separator and a negative electrode including graphite as an active material, a vinylidene fluoride resin as a binder, and carbon black as a conduction promoting agent was measured, and evaluation was performed for each of the positive electrode and the negative electrode to determine the wet adhesive strength.
Wet adhesive strength S: the electrode and the secondary battery separator were separated from each other with a strong force.
Wet adhesive strength A: the electrode and the secondary battery separator were separated from each other with a slightly strong force.
Wet adhesive strength B: the electrode and the secondary battery separator were separated from each other with a weak force.
wet adhesive strength C: the electrode and the secondary battery separator were separated from each other with an extremely weak force.

(7) Dry Adhesive Strength

A positive electrode (15 mm×100 mm) including $LiCoO_2$ as an active material, a vinylidene fluoride resin as a binder, and carbon black as a conduction promoting agent, and a secondary battery separator were disposed such that the active material and the porous layer were in contact with each other, thermal pressing was performed at 0.5 MPa, 80° C. and 0.4 m/min using a thermal roll pressing machine, the positive electrode and the secondary battery separator film were manually separated from each other using a pair of tweezers, and the dry adhesive strength was evaluated on the following four grades. Similarly, the dry adhesive strength between the secondary battery separator and a negative electrode including graphite as an active material, a vinylidene fluoride resin as a binder, and carbon black as a conduction promoting agent was measured, and evaluation was performed for each of the positive electrode and the negative electrode to determine the dry adhesive strength.
Dry adhesive strength S: the electrode and the secondary battery separator were separated from each other with a strong force.
Dry adhesive strength A: the electrode and the secondary battery separator were separated from each other with a slightly strong force.
Dry adhesive strength B: the electrode and the secondary battery separator were separated from each other with a weak force.
Dry adhesive strength C: the electrode and the secondary battery separator were separated from each other with an extremely weak force.

(8) Thermal Shrinkage Ratio (Dimensional Stability)

In a sample having a size of 100 mm×100 mm, the length from the midpoint of one side to the midpoint of opposite side was measured, the sample was heat-treated under a tension-free condition in an oven at 130° C. for 1 hour. After the heat treatment, the sample was taken out, the length between the midpoints at the same position as before the heat treatment was measured, and the thermal shrinkage ratio was calculated from the following equation. Thermal shrinkage ratios at two positions in one sample were calculated at the same time, and the average value thereof was defined as a thermal shrinkage ratio.

Thermal shrinkage ratio (%)=[(length between midpoints before heat treatment−length between midpoints after heat treatment)/(length between midpoints before heat treatment)]×100

Example 1

A fluororesin (polyvinylidene fluoride resin having a vinylidene fluoride content of 95 mol %, containing a carboxylic acid group as an acidic functional group, and having a melting point of 160° C.) composed of a copolymer of vinylidene fluoride and hexafluoropropylene was dissolved at 80° C. in 9,000 parts by mass of acetonitrile based on 100 parts by mass of the copolymer of vinylidene fluoride and hexafluoropropylene, and to the obtained solution was added 11 parts by mass of water based on 100 parts by mass of acetonitrile to prepare a polyvinylidene fluoride resin solution. The polyvinylidene fluoride resin solution at 76° C. was continuously added to a tank containing 5,000 parts by mass of normal-temperature water (hereinafter, referred to as a "particle-forming tank") based on 100 parts by mass of the copolymer of vinylidene fluoride resin and hexafluoropropylene so that a particle-forming liquid was obtained.

Next, a separately prepared polyvinylidene fluoride resin solution (76° C.), and 5,000 parts by mass of water (normal temperature) based on 100 parts by mass of the copolymer were simultaneously added dropwise to the particle-forming tank each at a rate which allowed the dropwise addition to be completed in 6 minutes, and at the same time, a particle-forming liquid was discharged from the bottom of the particle-forming tank such that the liquid level of the particle-forming liquid was maintained (particle-forming liquid A). Subsequently, a separately prepared polyvinylidene fluoride resin solution (76° C.), and 5,000 parts by mass of water (normal temperature) based on 100 parts by mass of the copolymer were simultaneously added dropwise to the particle-forming tank each at a rate which allowed the dropwise addition to be completed in 6 minutes, and at the same time, a particle-forming liquid was discharged from the bottom of the particle-forming tank such that the liquid level of the particle-forming liquid was maintained (particle-forming liquid B).

The particle-forming liquid A, the particle-forming liquid B, and the particle-forming liquid C remaining in the particle-forming tank were combined, acetonitrile was distilled off under reduced pressure, and the residue was centrifugally filtered. 500 parts by mass of ion-exchanged water was added to 100 parts by mass of the obtained water-containing cake, and the mixture was subjected to slurry washing and centrifugal filtration. 4 parts by mass of polyvinylpyrrolidone as a dispersant was added based on 100 parts by mass of the fluororesin in the water-containing cake, ion-exchanged water was then added so that the concentration of the fluororesin was 6% by mass, and the mixture was preliminarily dispersed by a homomixer. The predispersion liquid was treated with an ultrasonic wave (power: 120 W), and coarse particles were then separated by centrifugal sedimentation to obtain a water dispersion liquid including fluororesin particles having an average particle size of 0.10 µm. The measured weight average molecular weight of the obtained fluororesin was 2,200,000.

The fluororesin water dispersion liquid was mixed with polyethylene (melting point: 80° C.) as an organic resin different from the fluororesin (hereinafter, sometimes referred to as an "organic resin") and aluminum oxide particles (average particle size: 0.50 µm) as inorganic particles in a mass ratio of 1:1:3 in terms of a nonvolatile solid content, 0.95 parts by mass of an acrylic resin as a binder was added based on 100 parts by mass of the total of the fluororesin, the organic resin and the inorganic particles, 0.7 parts by mass of a perfluoroalkyl compound as a surfactant was added based on 100 parts by mass of the total of the fluororesin and the aluminum oxide particles to prepare a coating liquid. This coating liquid was applied to both surfaces of a polyethylene porous base material (thickness: 7 µm, air permeability: 120 seconds/100 cc) by gravure coating, and was dried until the contained solvent was volatilized so that a porous layer was formed to obtain a secondary battery separator.

The melting point of the fluororesin, the weight average molecular weight of the fluororesin, the average particle size of the fluororesin particles, the vinylidene fluoride content of the fluororesin, the presence/absence of an acidic functional group in the fluororesin, the ratio of the fluororesin in the total of the fluororesin, the organic resin and the inorganic particles ("ratio of fluororesin" in the table), the type of organic resin different from the fluororesin (hereinafter, sometimes referred to as an "organic resin"), the melting point of the organic resin, the ratio of the organic resin in the total of the fluororesin, the organic resin and the inorganic particles ("ratio of organic resin" in the table) are shown in Table 1. The ratio of the fluororesin was 19% by mass, and the ratio of the organic resin was 19% by mass.

For the obtained secondary battery separator, the thickness of the porous layer, the melting point of the porous layer, the air permeability, the wet adhesive strength, the dry adhesive strength, and the thermal shrinkage ratio were measured. The results are shown in Table 2.

Example 2

Except that polyvinylidene fluoride (melting point: 90° C.) was used for the organic resin, the same procedure as in Example 1 was carried out to obtain a secondary battery separator.

Example 3

Except that for the organic resin, polyethylene (melting point: 80° C.) and polyvinylidene fluoride (melting point: 90° C.) were used in a mass ratio of 1:4, and the ratio of the fluororesin and the ratio of the organic resin in the total of the fluororesin, the organic resin and the inorganic particles was 19% by mass and 23% by mass, respectively, the same procedure as in Example 1 was carried out to obtain a secondary battery separator.

Example 4

Except that polypropylene (melting point: 100° C.) was used for the organic resin, the same procedure as in Example 1 was carried out to obtain a secondary battery separator.

Example 5

Except that for the organic resin, polypropylene (melting point: 100° C.) and polyvinylidene fluoride (melting point: 90° C.) were used in a mass ratio of 1:4, and the ratio of the fluororesin and the ratio of the organic resin in the total of the fluororesin, the organic resin and the inorganic particles was 19% by mass and 23% by mass, respectively, the same procedure as in Example 1 was carried out to obtain a secondary battery separator.

Example 6

Except that polyethylene (melting point: 120° C.) was used for the organic resin, the same procedure as in Example 1 was carried out to obtain a secondary battery separator.

Example 7

Except that a fluororesin having a melting point of 130° C. and a weight average molecular weight of 500,000 was used, the same procedure as in Example 1 was carried out to obtain a secondary battery separator.

Example 8

Except that an acrylic resin (melting point: 80° C.) was used for the organic resin, the same procedure as in Example 1 was carried out to obtain a secondary battery separator.

Example 9

Except that a fluororesin having a melting point of 180° C. was used, the same procedure as in Example 1 was carried out to obtain a secondary battery separator.

Example 10

Except that a resin (polyvinylidene fluoride resin having a vinylidene fluoride content of 95 mol %, having no acidic functional group, and having a melting point of 160° C.) composed of a copolymer of vinylidene fluoride and hexafluoropropylene was used for the fluororesin, the same procedure as in Example 1 was carried out to obtain a secondary battery separator.

Example 11

Except that polyvinylidene fluoride (amorphous) as an amorphous organic resin was used for the organic resin, the same procedure as in Example 1 was carried out to obtain a secondary battery separator.

Example 12

Except that for the organic resin, polyethylene (melting point: 80° C.) and polyvinylidene fluoride (amorphous) as an amorphous organic resin were used in a mass ratio of 3:2, and the ratio of the fluororesin and the ratio of the organic resin in the total of the fluororesin, the organic resin and the inorganic particles was 19% by mass and 23% by mass, respectively, the same procedure as in Example 1 was carried out to obtain a secondary battery separator.

Example 13

Except that a fluororesin having a melting point of 190° C., a weight average molecular weight of 200,000 and an average particle size of 0.25 µm was used, the same procedure as in Example 1 was carried out to obtain a secondary battery separator.

Example 14

Except that the ratio of the fluororesin was 10% by mass, the same procedure as in Example 1 was carried out to obtain a secondary battery separator.

Example 15

Except that the ratio of the fluororesin was 10% by mass, the same procedure as in Example 3 was carried out to obtain a secondary battery separator.

Example 16

Except that the ratio of the organic resin having a melting point different from that of the fluororesin was 5% by mass, the same procedure as in Example 14 was carried out to obtain a secondary battery separator.

Comparative Example 1

Except that a fluororesin was not used, the same procedure as in Example 1 was carried out to obtain a secondary battery separator.

Comparative Example 2

Except that a fluororesin having a melting point of 100° C. and a weight average molecular weight of 400,000 was used, the same procedure as in Example 1 was carried out to obtain a secondary battery separator.

Comparative Example 3

Except that polyethylene (melting point: 150° C.) was used for the organic resin, the same procedure as in Example 1 was carried out to obtain a secondary battery separator.

TABLE 1

| | Fluororesin | | | | | | Organic resin having melting point different from that of fluororesin on the left | | | Average particle size of inorganic particles (μm) |
|---|---|---|---|---|---|---|---|---|---|---|
| | Melting point (° C.) | Weight average molecular weight (ten thousand) | Average particle size (μm) | Vinylidene fluoride content (mol %) | Presence/absence of acidic functional group | Ratio of fluororesin (% by mass) | Type | Melting point (° C.) | Ratio of organic resin (% by mass) | |
| Example 1 | 160 | 220 | 0.10 | 95 | Present | 19 | Polyethylene | 80 | 19 | 0.50 |
| Example 2 | 160 | 220 | 0.10 | 95 | Present | 19 | Polyvinylidene fluoride | 90 | 19 | 0.50 |
| Example 3 | 160 | 220 | 0.10 | 95 | Present | 19 | Polyethylene/polyvinylidene fluoride | 80/90 | 23 | 0.50 |
| Example 4 | 160 | 220 | 0.10 | 95 | Present | 19 | Polypropylene | 100 | 19 | 0.50 |
| Example 5 | 160 | 220 | 0.10 | 95 | Present | 19 | Polypropylene/polyvinylidene fluoride | 100/90 | 23 | 1.30 |
| Example 6 | 160 | 220 | 0.10 | 95 | Present | 19 | Polyethylene | 120 | 19 | 0.50 |
| Example 7 | 130 | 50 | 0.10 | 95 | Present | 19 | Polyethylene | 80 | 19 | 0.50 |
| Example 8 | 160 | 220 | 0.10 | 95 | Present | 19 | Acrylic resin | 80 | 19 | 0.50 |
| Example 9 | 180 | 220 | 0.10 | 95 | Present | 19 | Polyethylene | 80 | 19 | 0.50 |
| Example 10 | 160 | 220 | 0.10 | 95 | Absent | 19 | Polyethylene | 80 | 19 | 0.50 |
| Example 11 | 160 | 220 | 0.10 | 95 | Present | 19 | Polyvinylidene fluoride | Amorphous | 19 | 0.50 |
| Example 12 | 160 | 220 | 0.10 | 95 | Present | 19 | Polyethylene/polyvinylidene fluoride | 80/amorphous | 23 | 0.50 |
| Example 13 | 190 | 200 | 0.25 | 95 | Absent | 19 | Polyethylene | 80 | 19 | 0.50 |
| Example 14 | 160 | 220 | 0.10 | 95 | Present | 10 | Polyethylene | 80 | 19 | 0.50 |
| Example 15 | 160 | 220 | 0.10 | 95 | Present | 10 | Polyethylene/polyvinylidene fluoride | 80/90 | 23 | 0.50 |
| Example 16 | 160 | 220 | 0.10 | 95 | Present | 10 | Polyethylene | 80 | 5 | 0.50 |
| Comparative Example 1 | — | — | — | — | — | — | Polyethylene | 80 | 19 | 0.50 |
| Comparative Example 2 | 100 | 40 | 0.10 | 95 | Present | 19 | Polyethylene | 80 | 19 | 0.50 |
| Comparative Example 3 | 160 | 220 | 0.10 | 95 | Present | 19 | Polyethylene | 150 | 19 | 0.50 |

TABLE 2

| | Thickness of porous layer (μm) | Melting point of porous layer (° C.) | Air permeability (seconds/100 cc) | Wet adhesive strength | Dry adhesive strength | Thermal shrinkage ratio (%) |
|---|---|---|---|---|---|---|
| Example 1 | 1.5 | 80, 160 | 150 | S | A | 5 |
| Example 2 | 1.5 | 90, 160 | 150 | S | A | 5 |
| Example 3 | 1.5 | 80, 90, 160 | 160 | S | S | 5 |
| Example 4 | 1.5 | 100, 160 | 150 | S | A | 5 |
| Example 5 | 1.6 | 90, 100, 160 | 170 | S | A | 8 |
| Example 6 | 1.5 | 120, 160 | 150 | S | B | 5 |
| Example 7 | 1.5 | 80, 130 | 150 | A | A | 5 |
| Example 8 | 1.5 | 80, 160 | 150 | S | A | 5 |
| Example 9 | 1.5 | 80, 160 | 150 | A | A | 5 |
| Example 10 | 1.5 | 80, 160 | 150 | A | A | 5 |

TABLE 2-continued

| | Thickness of porous layer (μm) | Melting point of porous layer (° C.) | Air permeability (seconds/100 cc) | Wet adhesive strength | Dry adhesive strength | Thermal shrinkage ratio (%) |
|---|---|---|---|---|---|---|
| Example 11 | 1.5 | 160 | 150 | S | S | 5 |
| Example 12 | 1.5 | 80, 160 | 150 | S | S | 5 |
| Example 13 | 1.5 | 80, 190 | 150 | B | S | 5 |
| Example 14 | 1.5 | 80, 160 | 140 | A | A | 4 |
| Example 15 | 1.5 | 80, 90, 160 | 145 | A | S | 4 |
| Example 16 | 1.5 | 80, 160 | 140 | A | B | 4 |
| Comparative Example 1 | 1.6 | 80 | 160 | C | S | 5 |
| Comparative Example 2 | 1.5 | 80, 100 | 200 | C | S | 5 |
| Comparative Example 3 | 1.5 | 150, 160 | 200 | S | C | 5 |

Tables 1 and 2 show that the separators of Examples 1 to 10 and 13 to 16 have favorable wet adhesive strength and dry adhesive strength with an electrode, and a low thermal shrinkage ratio (high dimensional stability) because each of the separators includes a porous layer mainly composed of inorganic particles, and two or more organic resins having different melting points, at least one of the organic resins is a fluororesin, and (A) the porous layer having a melting point of 130° C. or higher and 20° C. or higher and lower than 130° C.

In addition, the separators of Examples 11 and 12 have favorable wet adhesive strength and dry adhesive strength with an electrode, and a low thermal shrinkage ratio (high dimensional stability) because each of the separators includes a porous layer mainly composed of inorganic particles, and two or more organic resins having different melting points, at least one of the organic resins is a fluororesin, and (B) the porous layer having a melting point of 130° C. or higher, and includes an amorphous organic resin.

On the other hand, the separator of Comparative Example 1 does not have sufficient wet adhesive strength with an electrode because it does not contain a fluororesin. The separator of Comparative Example 2 does not have sufficient wet adhesive strength with an electrode because the fluororesin has a low melting point. The separator of Comparative Example 3 does not have sufficient dry adhesive strength with an electrode because the organic resin has a high melting point.

The invention claimed is:

1. A secondary battery separator comprising: a porous base material; and a porous layer stacked on at least one surface of the porous base material, the porous layer being mainly composed of inorganic particles, and two or more organic resins having different melting points, the porous layer including a fluororesin as at least one of the organic resins, the secondary battery separator satisfying at least one of (A) and/or (B):
   (A) the porous layer has a first organic resin having a first melting point of 130° C. or higher, and a second organic resin having a second melting point of 20° C. or higher and lower than 130° C.; and
   (B) the porous layer has a melting point of 130° C. or higher, and includes an amorphous organic resin.

2. The secondary battery separator according to claim 1, that satisfies at least one of (C) and/or (D):
   (C) the first melting point is 130° C. or higher and lower than 180° C. and the second melting point is 20° C. or higher and lower than 130° C.; and
   (D) the melting point is 130° C. or higher and lower than 180° C., and includes the amorphous organic resin.

3. The secondary battery separator according to claim 1, wherein the organic resins include an acrylic resin and/or an olefin resin.

4. The secondary battery separator according to claim 1, wherein at least one of the organic resins has an acidic functional group.

5. The secondary battery separator according to claim 1, wherein the fluororesin is a polyvinylidene fluoride resin having a vinylidene fluoride content of 80 mol % or more and 100 mol % or less.

6. The secondary battery separator according to claim 5, wherein the polyvinylidene fluoride resin has a melting point of 130° C. or higher.

7. The secondary battery separator according to claim 6, wherein the polyvinylidene fluoride resin is in the form of particles, and has an average particle size of 0.01 μm or more and less than 1.00 μm.

8. The secondary battery separator according to claim 5, wherein the polyvinylidene fluoride resin is in the form of particles, and has an average particle size of 0.01 μm or more and less than 1.00 μm.

9. A secondary battery including the secondary battery separator according to claim 1.

10. A secondary battery separator comprising: a porous base material; and a porous layer stacked on at least one surface of the porous base material, the porous layer being mainly composed of inorganic particles, and two or more organic resins having different melting points, the porous layer including a fluororesin as at least one of the organic resins, the porous layer has a first organic resin having a first melting point of 130° C. or higher, and a second organic resin having a second melting point of 20° C. or higher and lower than 130° C.

11. A secondary battery including the secondary battery separator according to claim 10.

12. The secondary battery separator according to claim 10, that satisfies (C):
   (C) the first melting point is 130° C. or higher and lower than 180° C. and the second melting point is 20° C. or higher and lower than 130° C.

13. The secondary battery separator according to claim 10, wherein the organic resins include an acrylic resin and/or an olefin resin.

14. The secondary battery separator according to claim 10, wherein at least one of the organic resins has an acidic functional group.

15. The secondary battery separator according to claim 10, wherein the fluororesin is a polyvinylidene fluoride resin having a vinylidene fluoride content of 80 mol % or more and 100 mol % or less.

16. The secondary battery separator according to claim 15, wherein the polyvinylidene fluoride resin has a melting point of 130° C. or higher.

* * * * *